United States Patent
Aziz et al.

(10) Patent No.: US 8,107,522 B2
(45) Date of Patent: Jan. 31, 2012

(54) METHODS AND APPARATUS FOR DETERMINING RECEIVER FILTER COEFFICIENTS FOR A PLURALITY OF PHASES

(75) Inventors: Pervez M. Aziz, Dallas, TX (US); Mohammad S. Mobin, Orefield, PA (US); Lane A. Smith, Easton, PA (US)

(73) Assignee: Agere Systems, Inc., Allentown, PA (US)

(*) Notice: Subject to any disclaimer, the term of this patent is extended or adjusted under 35 U.S.C. 154(b) by 902 days.

(21) Appl. No.: 11/870,908

(22) Filed: Oct. 11, 2007

(65) Prior Publication Data
US 2009/0097541 A1 Apr. 16, 2009

(51) Int. Cl.
*H03H 7/30* (2006.01)
(52) U.S. Cl. ........ 375/233; 375/229; 375/230; 375/231; 375/232; 375/234; 375/316; 375/317; 375/340; 375/344; 375/345; 375/346; 375/350; 708/300
(58) Field of Classification Search .......... 375/229–233, 375/226, 227, 234, 316, 317, 340, 344, 345, 375/346, 350; 708/300
See application file for complete search history.

(56) References Cited

U.S. PATENT DOCUMENTS

| 7,574,146 B2* | 8/2009 | Chiang et al. ................. 398/209 |
| 7,746,924 B2* | 6/2010 | Bois et al. ..................... 375/232 |
| 2002/0085656 A1 | 7/2002 | Lee et al. |
| 2007/0195874 A1* | 8/2007 | Aziz et al. ..................... 375/233 |
| 2009/0086807 A1* | 4/2009 | Aziz et al. ..................... 375/233 |

* cited by examiner

*Primary Examiner* — Leon Flores
(74) *Attorney, Agent, or Firm* — Ryan, Mason & Lewis, LLP

(57) ABSTRACT

Methods and apparatus are provided for determining receiver filter coefficients for a plurality of phases. One or more coefficients for a receiver filter are determined by determining a first coefficient for a first phase of a data eye; and determining a second coefficient for a second phase of the data eye. The receiver filter may be, for example, a decision-feedback equalizer. The first and second coefficients may be determined by performing an LMS adaptation of decision-feedback equalization coefficients. In another embodiment, the first and second coefficients may be determined by obtaining eye opening metrics from a data eye monitor corresponding to each of the respective first phase and the second phase; and determining the respective first and second coefficients based on the eye opening metrics. The first and second phases can correspond to odd and even phases.

21 Claims, 12 Drawing Sheets

FIG. 2

| $\hat{y}(n-1)$ | $\hat{y}(n-1/2)$ | $\hat{y}(n)$ | PDOUT |
|---|---|---|---|
| 0 | 0 | 0 | 0 (NO DATA TRANSITION) |
| 0 | 0 | 1 | -1 |
| 0 | 1 | 0 | 0 |
| 0 | 1 | 1 | 1 |
| 1 | 0 | 0 | 1 |
| 1 | 0 | 1 | 0 |
| 1 | 1 | 0 | -1 |
| 1 | 1 | 1 | 0 (NO DATA TRANSITION) |

| $\hat{y}_d(n-1)$ | $\hat{y}_{dt}(n)$ | $\hat{y}_d(n)$ | DFE_PDOUT |
|---|---|---|---|
| 0 | 0 | 0 | 0 (NO DATA TRANSITION) |
| 0 | 0 | 1 | −1 |
| 0 | 1 | 0 | 0 |
| 0 | 1 | 1 | 1 |
| 1 | 0 | 0 | 1 |
| 1 | 0 | 1 | 0 |
| 1 | 1 | 0 | −1 |
| 1 | 1 | 1 | 0 (NO DATA TRANSITION) |

METHODS AND APPARATUS FOR DETERMINING RECEIVER FILTER COEFFICIENTS FOR A PLURALITY OF PHASES

CROSS-REFERENCE TO RELATED APPLICATIONS

The present application is related to U.S. patent application Ser. No. 11/540,946, filed Sep. 29, 2006, entitled "Method and Apparatus for Determining Latch Position for Decision-feedback Equalization Using Single-Sided Eye," incorporated by reference herein

FIELD OF THE INVENTION

The present invention relates generally to signal processing techniques, and more particularly, to techniques for determining receiver filter coefficients.

BACKGROUND OF THE INVENTION

Digital communication receivers must sample an analog waveform and then reliably detect the sampled data. Signals arriving at a receiver are typically corrupted by intersymbol interference (ISI), crosstalk, echo, and other noise. Thus, receivers typically equalize the channel, to compensate for such distortions, and decode the encoded signals at increasingly high clock rates. Decision-feedback equalization (DFE) is a widely-used technique for removing intersymbol interference and other noise. For a detailed discussion of decision feedback equalizers, see, for example, R. Gitlin et al, Digital Communication Principles, (Plenum Press 1992) and E. A Lee and D. G. Messerschmitt, Digital Communications, (Kluwer Academic Press, 1988), each incorporated by reference herein. Generally, decision-feedback equalization utilizes a nonlinear equalizer to equalize the channel using a feedback loop based on previously decided symbols Duty cycle distortion is another source of impairment in a received signal. The duty cycle of a clock, for example, is the percentage of time that the clock signal has a given value. A clock should typically demonstrate a 50% duty cycle, such that the clock signal should alternate between two amplitude values, each for 50% of the total duration. Duty cycle distortion arises due to device mismatches and due to variations of the differential signal paths for clock and data The target 50% duty cycle feature is particularly important for high-speed applications where both positive and negative edges are used.

A need exists for improved methods and apparatus for detecting and correcting for impairments in a received signal, such as duty cycle distortion. A further need exists for methods and apparatus that determine the coefficients or thresholds for one or more receiver filters, such as a DFE filter.

SUMMARY OF THE INVENTION

Generally, methods and apparatus are provided for determining receiver filter coefficients for a plurality of phases. According to a first aspect of the invention, one or more coefficients for a receiver filter are determined by determining a first coefficient for a first phase of a data eye; and determining a second coefficient for a second phase of the data eye. The receiver filter may be, for example, a decision-feedback equalizer. The first and second coefficients may be determined by performing an LMS adaptation of decision-feedback equalization coefficients. In another embodiment, the first and second coefficients may be determined by obtaining eye opening metrics from a data eye monitor corresponding to each of the respective first phase and the second phase; and determining the respective first and second coefficients based on the eye opening metrics. The first and second phases can correspond to odd and even phases.

According to another aspect of the invention, a threshold position of one or more latches employed by a decision-feedback equalizer is determined by obtaining a plurality of samples of a data eye using a data eye monitor; obtaining a first eye opening metric from the data eye monitor corresponding to a first phase and a second eye opening metric from the data eye monitor corresponding to a second phase; determining a first threshold position associated with the first phase for the one or more latches based on the first eye opening metric; and determining a second threshold positron associated with the second phase for the one or more latches based on the second eye opening metric.

Generally, the first and second eye opening metrics measure a degree of opening of a data eye The eye opening metric can be obtained for a plurality of latch settings and the latch setting that approximately maximizes the eye opening metric can be selected. The data eye is optionally a single-sided data eye that contains transitions from a first binary value to a binary value of 0 or 1. In addition, a first amplitude value associated with the first eye opening metric corresponding to the first phase and a second amplitude value associated with the second eye opening metric corresponding to the second phase can optionally be obtained and used to compute the threshold positions.

A more complete understanding of the present invention, as well as further features and advantages of the present invention, will be obtained by reference to the following detailed description and drawings.

BRIEF DESCRIPTION OF THE DRAWINGS

FIG. 2 is a table characterizing the input/output relationship of the BBPD of FIG. 1;

FIG. 6 is a sample truth table for the exemplary DFE equalized BBPD of FIG. 5;

Figure 8:
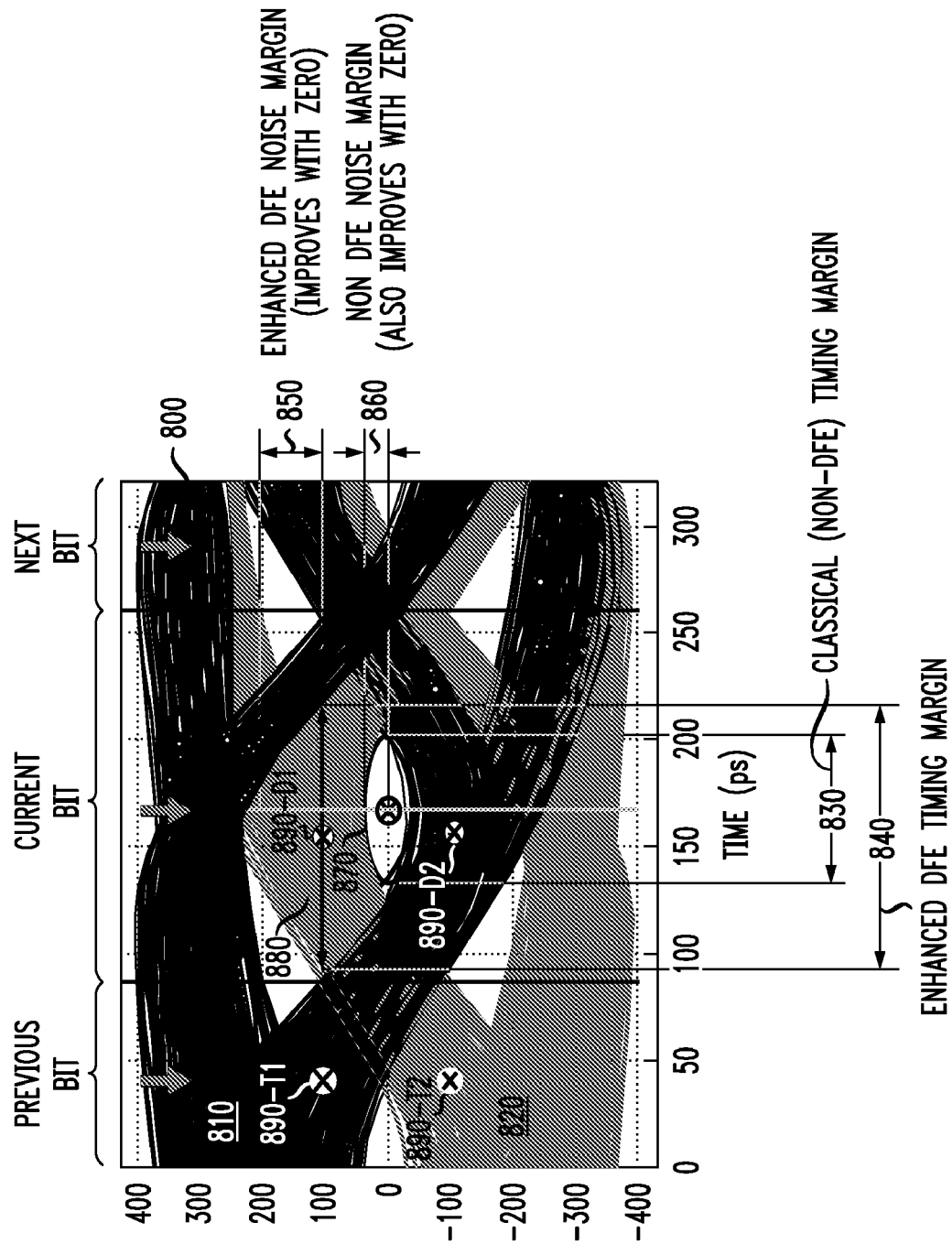
Figure 9:
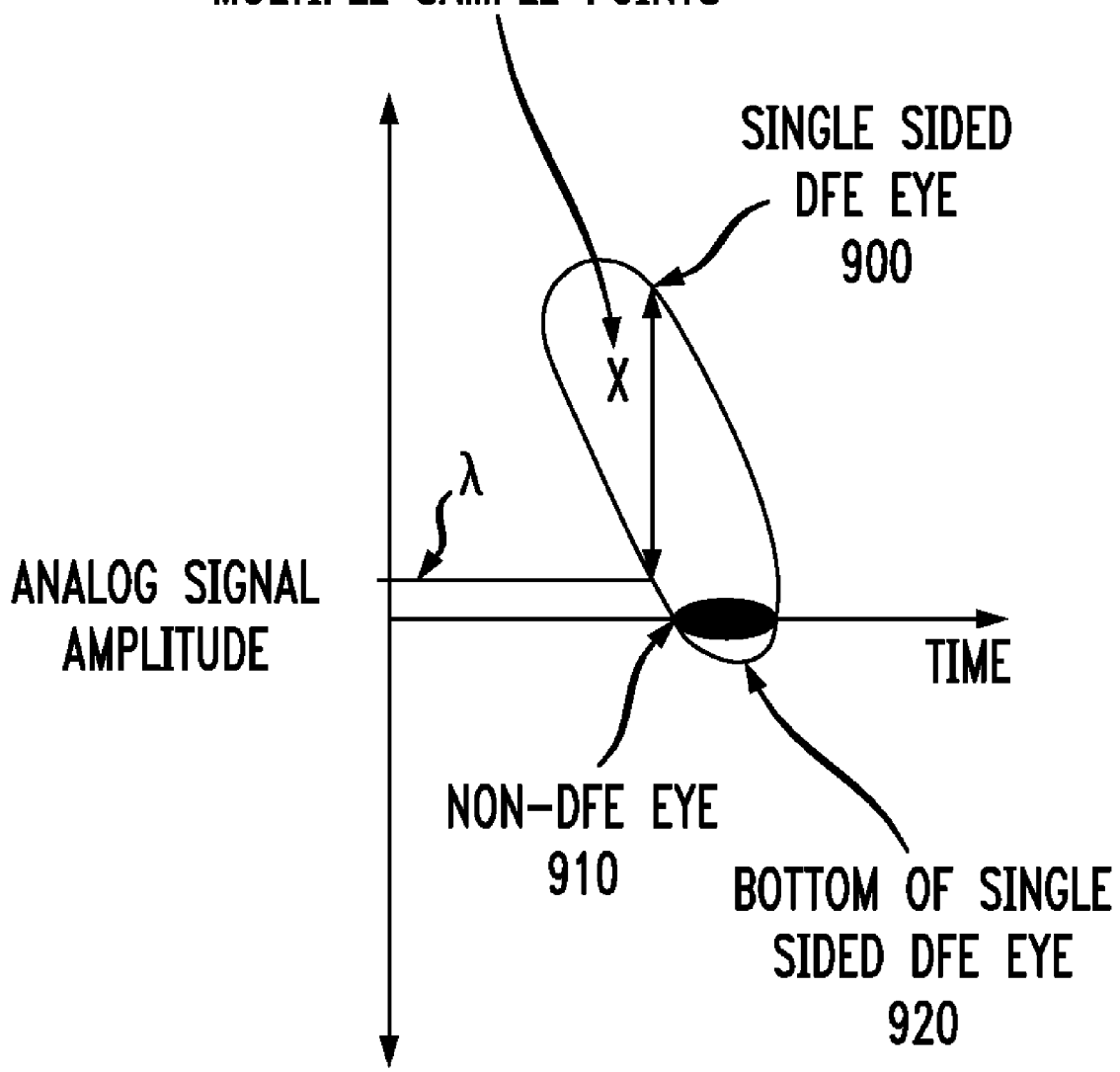
Figure 10:
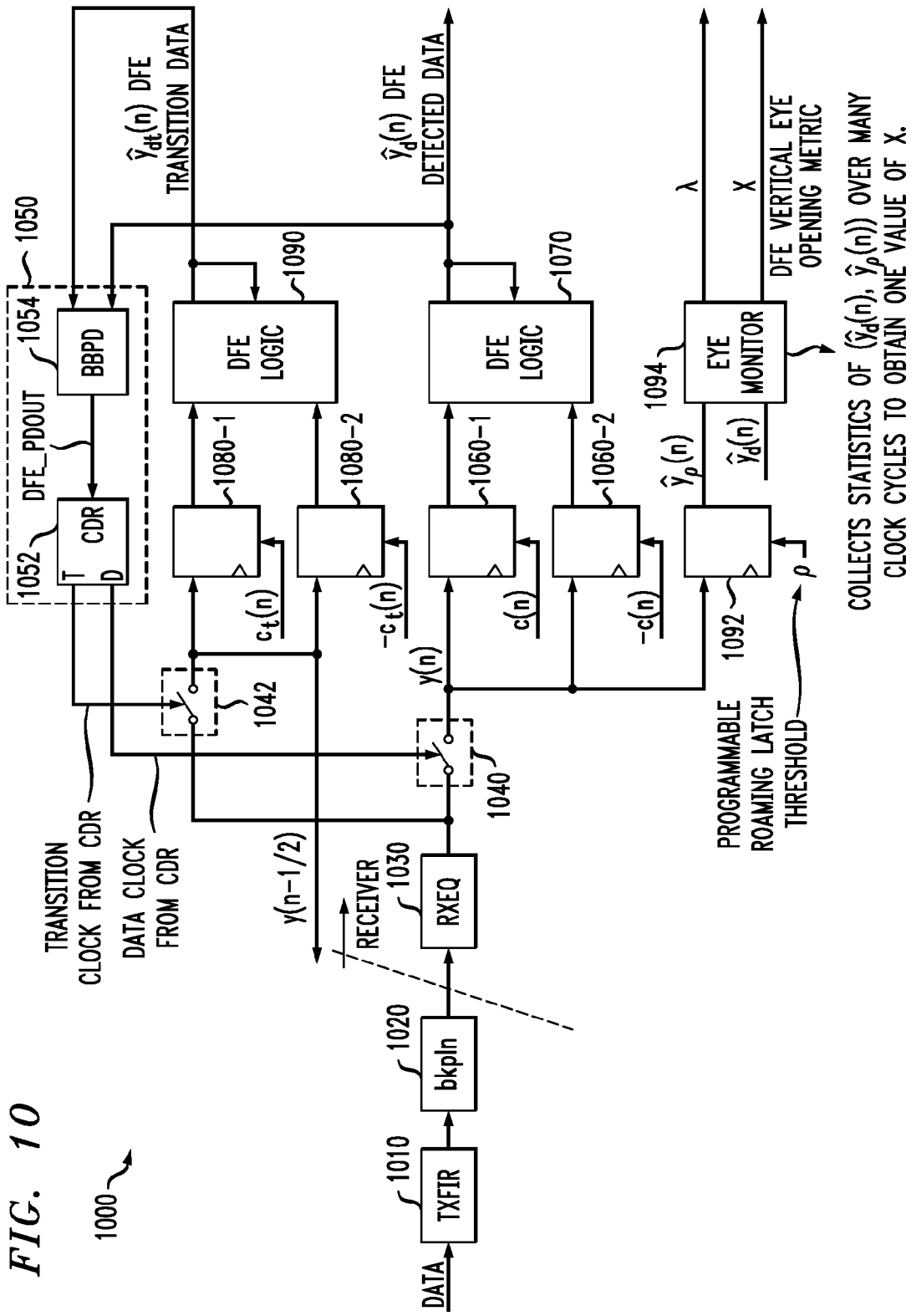
Figure 11:
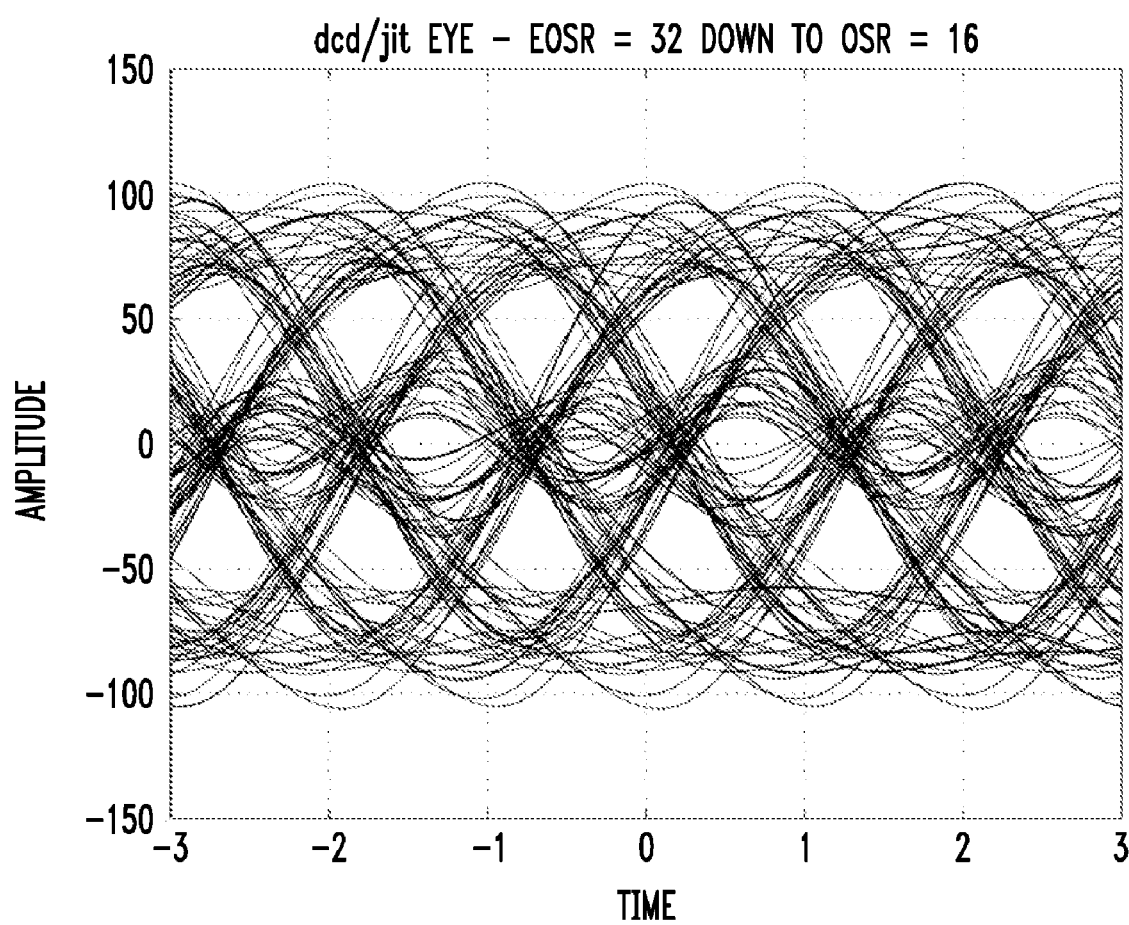
Figure 12:
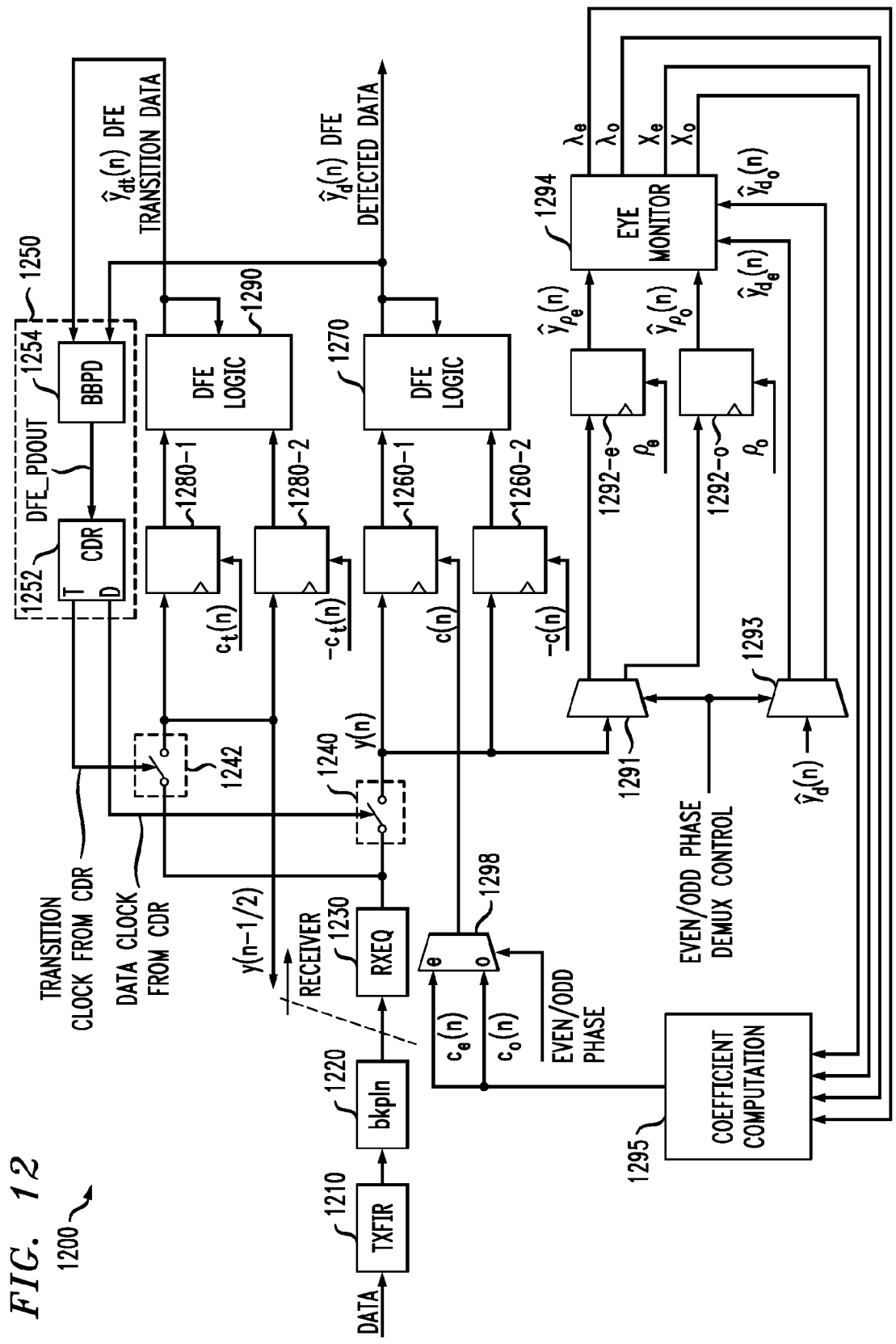

FIG, 7 illustrates an eye diagram at the output of the RXEQ of an exemplary serializer/deserializer communication channel where duty cycle distortion is not present;

FIG. 8 illustrates the noise and timing margins for a received signal, as well as the threshold determination of one or more DFE latches;

FIG. 9 illustrates a single-sided data eye and a number of measured data eye metrics in accordance with an embodiment of the present invention;

FIG. 10 is a block diagram of a serializer/deserializer communication channel that measures the data eye metrics shown in FIG. 9 in accordance with the present invention;

FIG. 11 illustrates an eye diagram at the output of the RXEQ of an exemplary serializer/deserializer communication channel in the presence of duty cycle distortion; and FIG. 12 is a block diagram of a serializer/deserializer communication channel that determines one or more filter coefficients based on the measured data eye metrics of FIG. 9 in accordance with the present invention.

DETAILED DESCRIPTION

The present invention provides methods and apparatus for detecting and correcting for impairments in a received signal, such as duty cycle distortion. According to one aspect of the invention, methods and apparatus are provided for determining the coefficients or thresholds for one or more receiver filters, such as a DFE filter. A data eye monitor is used to obtain eye opening metrics corresponding to odd and even phases. Threshold positions for one or more latches are then determined based on the eye opening metrics for each of the odd and even phases.

Figure 1:
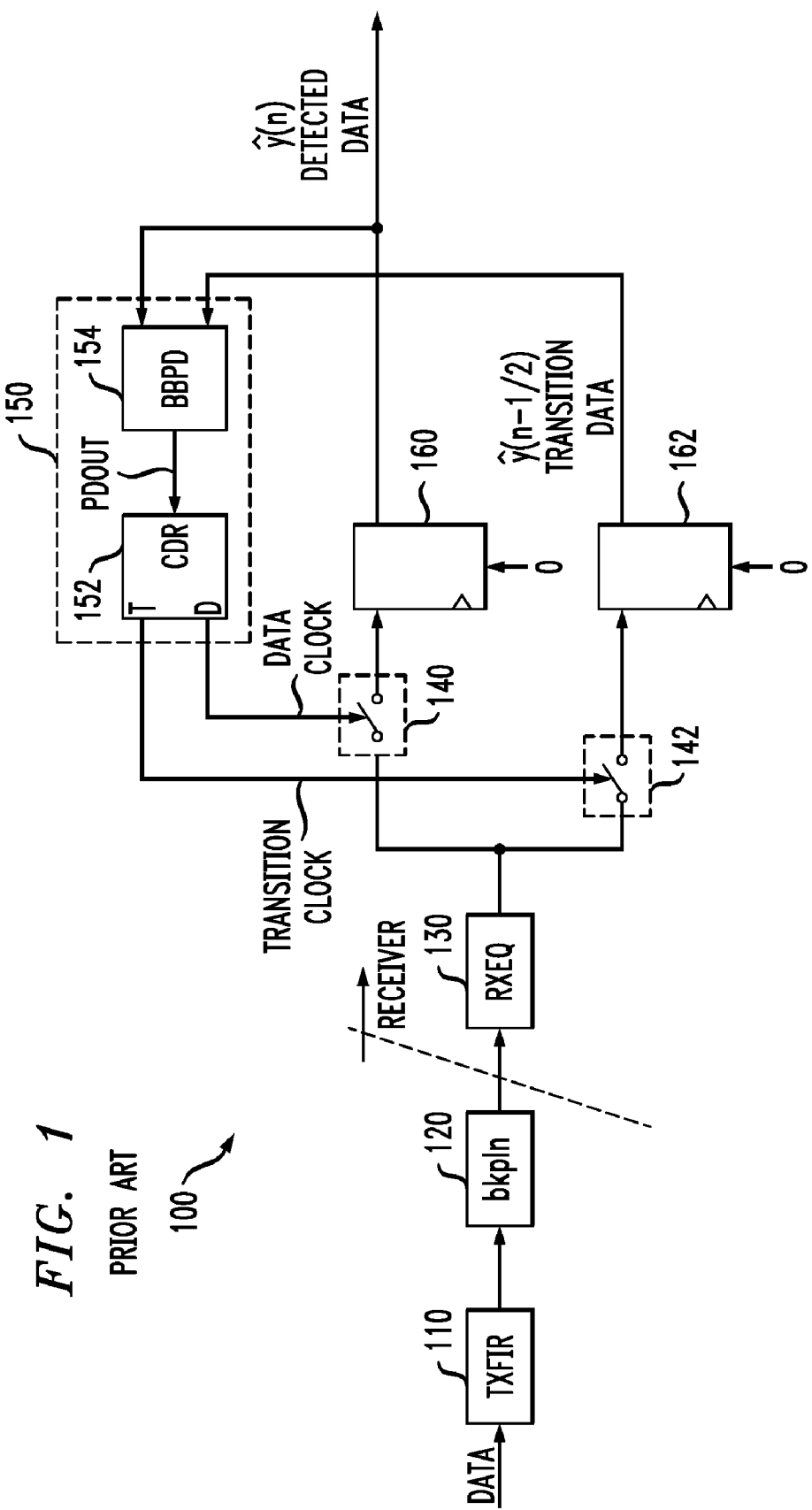
FIG. 1 is a block diagram of a conventional serializer/deserializer communication channel having a channel impairment.

FIG. 1 is a block diagram of a conventional serializer/deserializer communication channel 100 having a channel impairment that is due, for example, to a physical transmission medium, such as a backplane or drive head in a magnetic recording system. In the exemplary implementation shown in FIG. 1, the data is transmitted through a backplane channel 120 after optionally being equalized or filtered through a transmit FIR filter (TXFIR) 110. After passing though the backplane 120, the analog signal may optionally be filtered or equalized by a receive equalizer (RXEQ) 130 which may consist, for example, of a continuous time filter. The analog signal out of the RXEQ 130 is sampled at the baud rate by a switch 140 using a sampling clock generated by a clock/data recovery (CDR) circuit 150. A data detector 160 (or a slicer) digitizes the sample and compares the digitized sample to an exemplary threshold of zero, using the CDR recovered clock.

The phase of the analog waveform is typically unknown and there may be a frequency offset between the frequency at which the original data was transmitted and the nominal receiver sampling clock frequency. The function of the CDR 150 is to properly sample the analog waveform such that when the sampled waveform is passed through a data detector 160, the data is recovered properly despite the fact that the phase and frequency of the transmitted signal is not known. The CDR 150 is often an adaptive feedback circuit and the feedback loop must adjust the phase and frequency of the nominal clock to produce a modified recovered clock that can sample the analog waveform to allow proper data detection.

As previously indicated, the data detector 160 can be implemented as a slicer (i.e., a decision device based on an amplitude threshold) or a more complicated detector such as a sequence detector. For high speed applications, the data detector 160 is often implemented as a slicer that is clocked by the CDR clock. In addition to sampling the data signal, the slicer 160 essentially quantizes the signal to a binary "1" or "0" based on the sampled analog value and a slicer threshold, $s_t$. If the input to the slicer 160 at time n is w(n), then the output, $\hat{y}(n)$, of the slicer 160 is given as follows:

$$\hat{y}(n) = 1 \quad \text{if } w(n) > s_t \qquad (1)$$
$$= 0 \quad \text{otherwise}$$

In general, the CDR 150 may be composed of several components, such as a phase detector (PD), a loop filter, and a clock generation circuit. As shown in FIG. 1, the exemplary CDR 150 is comprised of a loop filter 152 embodied as a digital loop filter (CDR loop filter and clock generation) and a phase detector 154 embodied as a bang-bang phase detector (BBPD). For a discussion of bang-bang phase detector, see, for example, J. D. H. Alexander, "Clock Recovery from Random Binary Signals," Electronics Letters, 541-42 (October, 1975), incorporated by reference herein.

The BBPD 154 processes several quantities to compute an estimate of timing adjustment needed to properly sample the signal, in a known manner. The timing adjustment is filtered by the loop 152 before adjusting the phase of the sampling clocks For the BBPD 154, there needs to be two sampling clocks: a data sampling clock which samples the recovered data and a transition sampling clock that is offset from the data clock by half a baud period $$\frac{T}{2}$$

and which samples the "transition" data. The transition sample data is denoted as $\hat{y}(n-\frac{1}{2})$ to indicate is sampled relative to $\hat{y}(n)$ by a phase offset of $$\frac{T}{2}.$$

In addition, the BBPD 154 makes use of a one baud period delayed version of the recovered data. The delayed data is $\hat{y}(n-1)$ (not shown explicitly in FIG. 1). Generally, the delayed data, $\hat{y}(n-1)$, can be created internally by the BBPD 154 from $\hat{y}(n)$. The BBPD input/output relationship is characterized by the look up table 200 shown in FIG. 2. Since the BBPD 154 requires more than one sample per baud period, the BBPD 154 is classified as an over sampled phase detector

DFE Background

As data rates increase for serializer/deserializer applications, the channel quality degrades and the use of decision feedback equalization (DFE) in conjunction with finite impulse response (TXFIR) and receive equalization (RXEQ) filtering will be required to achieve the bit error rate (BER) performance required by more and more demanding applications. Note that the FIR function of the transmitter (TX) might be moved from the transmitter to the receiver (RX) and incorporated into the RXEQ function.

Figure 3:
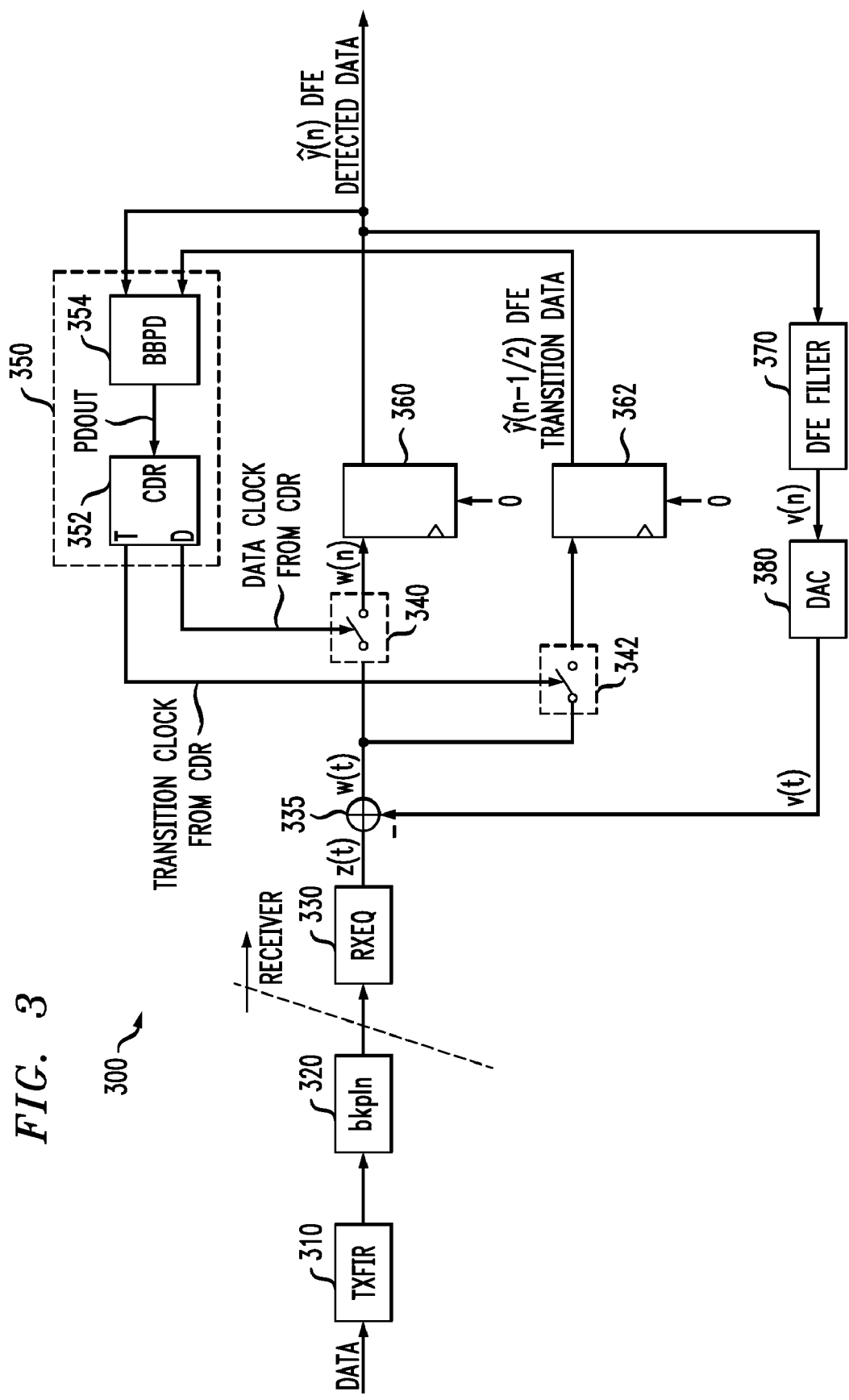
FIG. 3 is a block diagram of a serializer/deserializer communication channel incorporating a traditional DFE based equalizer.

FIG. 3 is a block diagram of a serializer/deserializer communication channel 300 that incorporates a traditional DFE based equalizer in addition to the TX and RX equalization of FIG. 1. As shown in FIG. 3, the data is transmitted through a backplane channel 320 after optionally being equalized or filtered through a transmit FIR filter (TXFIR) 310. After passing though the backplane 320, the analog signal may optionally be filtered or equalized by a receive equalizer (RXEQ) 330 which may consist, for example, of a continuous time filter. The analog signal out of the RXEQ 330 is sampled at the baud rate by a switch 340 using a sampling clock generated by a clock/data recovery (CDR) circuit 352, in a similar manner to FIG. 1.

As discussed hereinafter, a DFE correction, v(t), generated by a DFE filter 370 and digitized by a digital-to-analog converter 380 is subtracted by an analog summer 335 from the output, z(t), of the RXEQ 330 to produce a DFE corrected signal w(t).

$$w(t) = z(t) - v(t) \qquad (2)$$

Then, the signal w(t) is sampled by a switch 340:

$$w(n) = w(nT) \quad (3)$$

with T being the baud period The sampled signal w(n) is then sliced by a sheer 360 to produce the detected data ŷ(n). The slicer output in turn is used to produce the filtered DFE output v(n) which is converted by the DAC 380 to the continuous time signal v(t). The DTE filter output 380 is given by:

$$v(n) = \sum_{l=1}^{L} b(l)\hat{y}(n-l) \quad (4)$$

where b(l) represents the coefficients of the L tap DFE.

As discussed above in conjunction with FIG. 1, the BBPD 354 requires two sampling clocks: a data sampling clock which samples the recovered data and a transition sampling clock that is offset from the data clock by half a baud period $$\frac{T}{2}$$

and which samples the "transition" data. The analog signal out of the RXEQ 330 is sampled at the baud rate by a switch 342 using the transition clock. The sampled signal w(n) is also sliced by a second slicer 362 to produce the detected data ŷ(n−½). The transition sample data is denoted as ŷ(n−½) to indicate is sampled relative to ŷ(n) by a phase offset of $$\frac{T}{2}.$$

It is noted that the DFE filter 370 uses as its input past data decisions starting at y(n−1) and earlier. The DFE filter 370 does not use the current decision ŷ(n). This guarantees that the operation is causal. Since an analog representation, w(t), of the DFE signal exists, it can be sampled directly by both the data clock using switch 340 (to produce w(n)) and the transition clock using switch 342 and these sampled latched signals can drive a traditional BBPD 354. For this circuit 300 to work, the entire DFE loop correction must be performed within one baud period T before the next correction is needed. At very high data rates, it is difficult to design circuits that operate this fast or to make them very accurate.

Consequently, a well known technique may be employed whereby the DFE terms are "precomputed" and chosen based upon the amplitude value of y(n). Since there is no DFE feedback loop, the process of generating the DFE "corrected" decisions can be pipelined.

Figure 4:
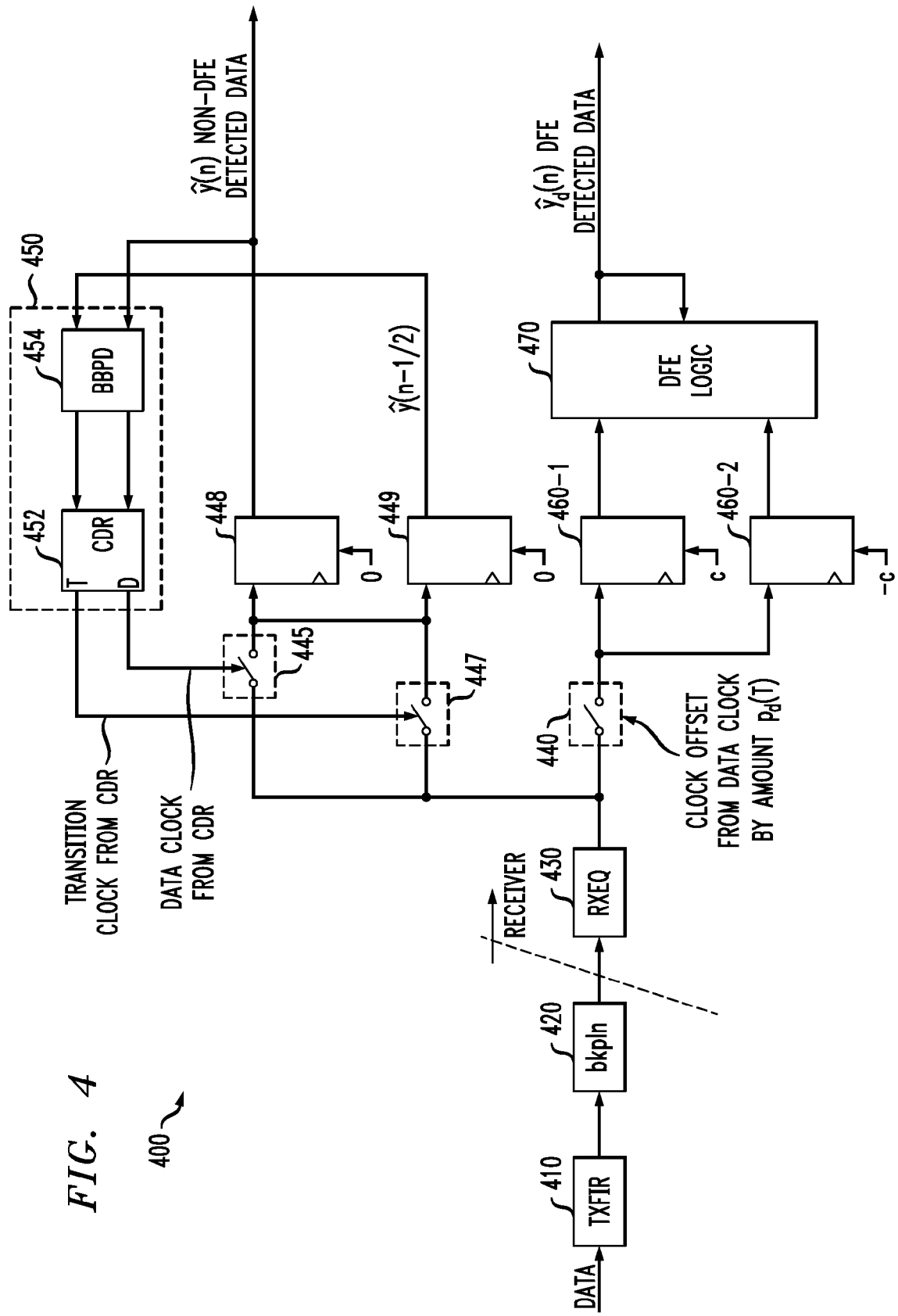
FIG. 4 is a block diagram of a serializer/deserializer communication channel that incorporates precomputation of the DFE terms.

FIG. 4 is a block diagram of a serializer/deserializer communication channel 400 that incorporates precomputation of the DFE terms, in addition to the TX and RX equalization of FIGS. 1 and 3. The exemplary embodiment shown in FIG. 4 is for a one tap (L−1) DFE that makes use of a DFE coefficient b(l). For simplicity of notation, b(l) is denoted by the variable c.

As shown in FIG. 4, the data is transmitted through a backplane channel 420 after optionally being equalized or filtered through a transmit FIR filter (TXFIR) 410. After passing though the backplane 420, the analog signal may optionally be filtered or equalized by a receive equalizer (RXEQ) 430. The analog output of the RXEQ 430 is sampled at the baud rate by switches 440, 445, 447. The switch 445 uses a data clock generated by the clock/data recovery circuit 452 and switch 447 uses a transition clock generated by the clock/data recovery circuit 452, in a similar manner to FIG. 3. Latches 448, 449 having exemplary thresholds of 0 are used to generated a decision from the non-DFE equalized signal, in a similar manner to FIG. 3.

As shown in FIG. 4, exemplary latches 460-1 and 460-2 having thresholds of c and −c, respectively, are used to generate a decision for the DFE equalized signal. The decisions from the DFE slicer latches 460 are combined by the DFE logic 470 with the previous DFE detected bit decision, ŷ$_d$(n−1) (represented in FIG. 4 by the arrow fed back into the DFE logic block 470) to produce the final DFE corrected decision ŷ$_d$(n). The DFE path computation logic can be pipelined thereby eliminating the bottleneck of having to complete the computation in one baud period. The DFE logic 470 selects from the pre-computed decisions, which are the outputs of the latches 460 with thresholds c and c, based on the past decision ŷ$_d$(n−1)

For the case when ŷ$_d$(n−1)=1, $$\hat{y}_d(n) = 1 \quad \text{if } y(n) > c$$
$$= 0 \quad \text{if } y(n) < c$$

For the case when ŷ$_d$(n−1)=0, $$\hat{y}_d(n) = 1 \quad \text{if } y(n) > -c$$
$$= 0 \quad \text{if } y(n) < -c$$

The outputs of the latches 460 are applied to DFE logic 470 to generate the DFE corrected decision ŷ$_d$(n).

The DFE and non-DFE decision operations may have different optimal sampling points. Therefore, the DFE latches should be sampled with a correct sampling phase that may be offset from the normal CDR data clock sampling phase by some offset p$_d$ in units of baud interval T. Thus, the switch 440 in the DFE path is controlled by a clock that is offset from the CDR data clock by an amount equal to p$_d$(T). A number of techniques have been proposed or suggested for manually establishing the offset p$_d$(T). The optimal sampling phase, however, is dependent on the channel or other equalizer settings. Thus, the sampling phase can be adaptively determined using the techniques described in United States Patent Application entitled "Method and Apparatus for Adaptively Establishing a Sampling Phase for Decision-Feedback Equalization," filed Feb. 17, 2006, and incorporated by reference herein.

It is noted that the DFE can extended to more than one tap at the expense of additional area and computation time. The exemplary DFE phase placement circuit presented herein can be extended to a system with multiple DEE taps without changing the DFE phase placement circuit. For additional taps, the number of latches and the DFE logic block would be modified, as would be apparent to a person of ordinary skill in the art.

In the DFE precomputation embodiment shown in FIG. 4, the DFE correction is not fed back to correct the output of the RXEQ 430 and the BBPD 454 is thus controlled by non-DFE detected data ŷ(n) and ŷ(n−½). Thus, the BBPD 154, 354, 454 is processing unequalized data ŷ(n) and ŷ(n−½) containing channel impairments. Methods and apparatus are employed for generating one or more clock signals for a decision-feedback equalizer using DFE detected data.

DFE Clock Generation Using DFE Detected Data

As discussed hereinafter in conjunction with FIG. 5, appropriate signals can be created to drive an over sampled phase detector, such as a BBPD, to compute the required phase adjustment for a DFE equalized signal. In particular, a "DFE transition" data $\hat{y}_{dt}(n)$ are generated using rules similar to that of the regular DFE data $\hat{y}_d(n)$. The DFE transition data $\hat{y}_{dt}(n)$ is obtained based on the non-DFE transition sample amplitude values using the same DFE logic from which the DFE recovered data $\hat{y}_d(n)$ is obtained from the non-DFE data clock sampled amplitude y(n)

DFE Equalized BBPD

Figure 5:
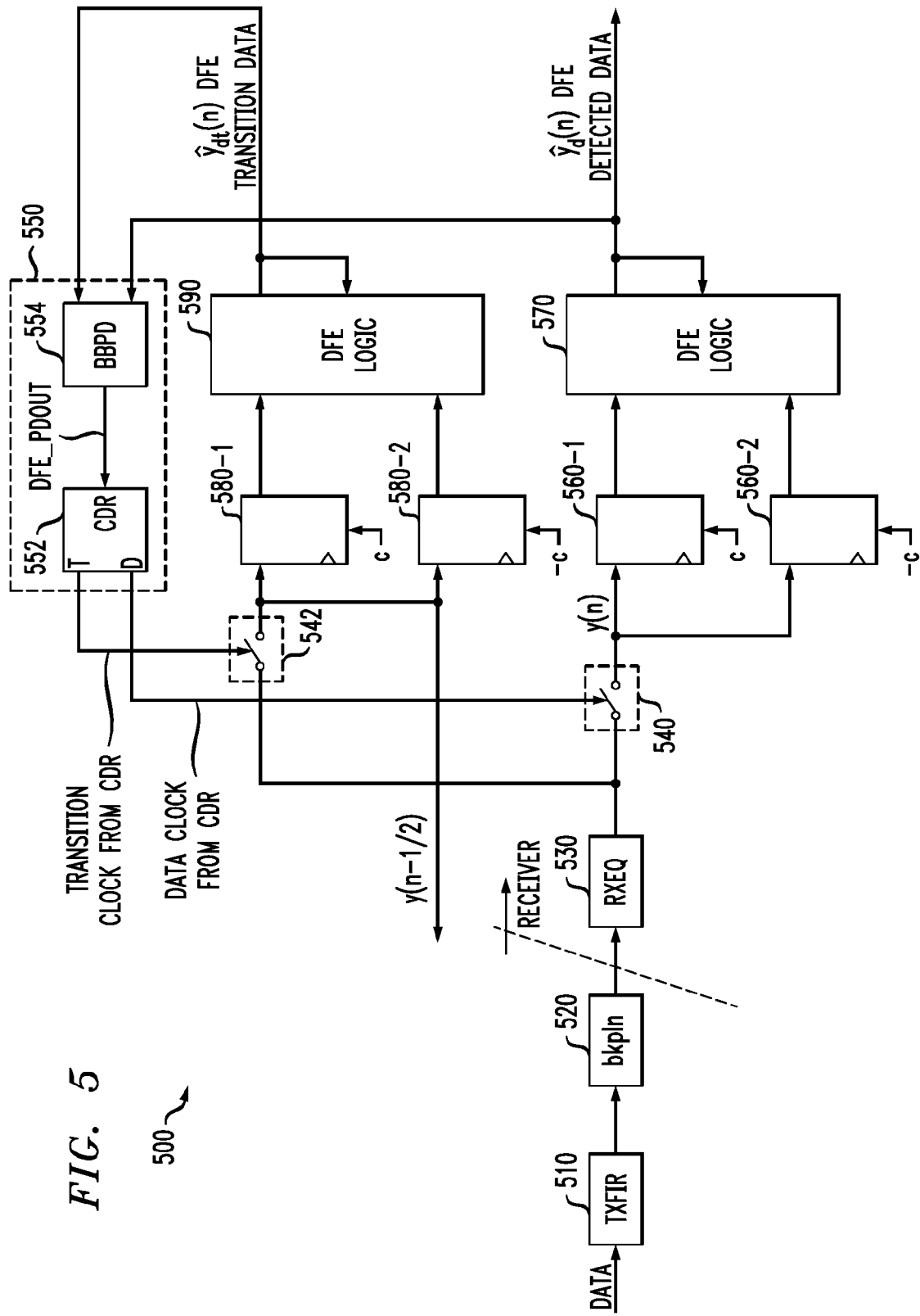
FIG. 5 is a block diagram of a serializer/deserializer communication channel.

FIG. 5 is a block diagram of a serializer/deserializer communication channel 500. The channel 500 of FIG. 5 comprises a transmit FIR filter (TXFIR) 510, backplane channel 520, RXEQ 530, switch 540, CDR circuit 550, exemplary latches 560-1 and 560-2, and DFE logic 570, in a similar manner to FIG. 4.

In addition, the channel 500 includes a switch 543, latches 580-1 and 580-2, and DFE logic 590, for the creation of the DFE transition data The DFE transition data is created as follows:

For the case when $\hat{y}_{dt}(n-1)=1$, $$\hat{y}_{dt}(n) = 1 \quad \text{if } y(n-1/2) > c$$
$$= 0 \quad \text{if } y(n-1/2) < c$$

For the case when $\hat{y}_{dt}(n-1)=0$, $$\hat{y}_{dt}(n) = 1 \quad \text{if } y(n-1/2) > -c$$
$$= 0 \quad \text{if } y(n-1/2) < -c$$

where $y(n-\frac{1}{2})$ represents the amplitude of the non-DFE transition sampled data FIG. 6 is a sample truth table 600 for the exemplary DFE equalized BBPD 554 of FIG. 5. Generally, the truth table 600 remains the same as above, but is now driven by the DFE detected data $\hat{y}_d(n)$ as well as the synthesized DFE transition data $\hat{y}_{dt}(n)$ created in the manner described above

Receiver Filter Coefficients for Even/Odd Phases

DCD-Free Eye Diagrams and Performance

Figure 7:
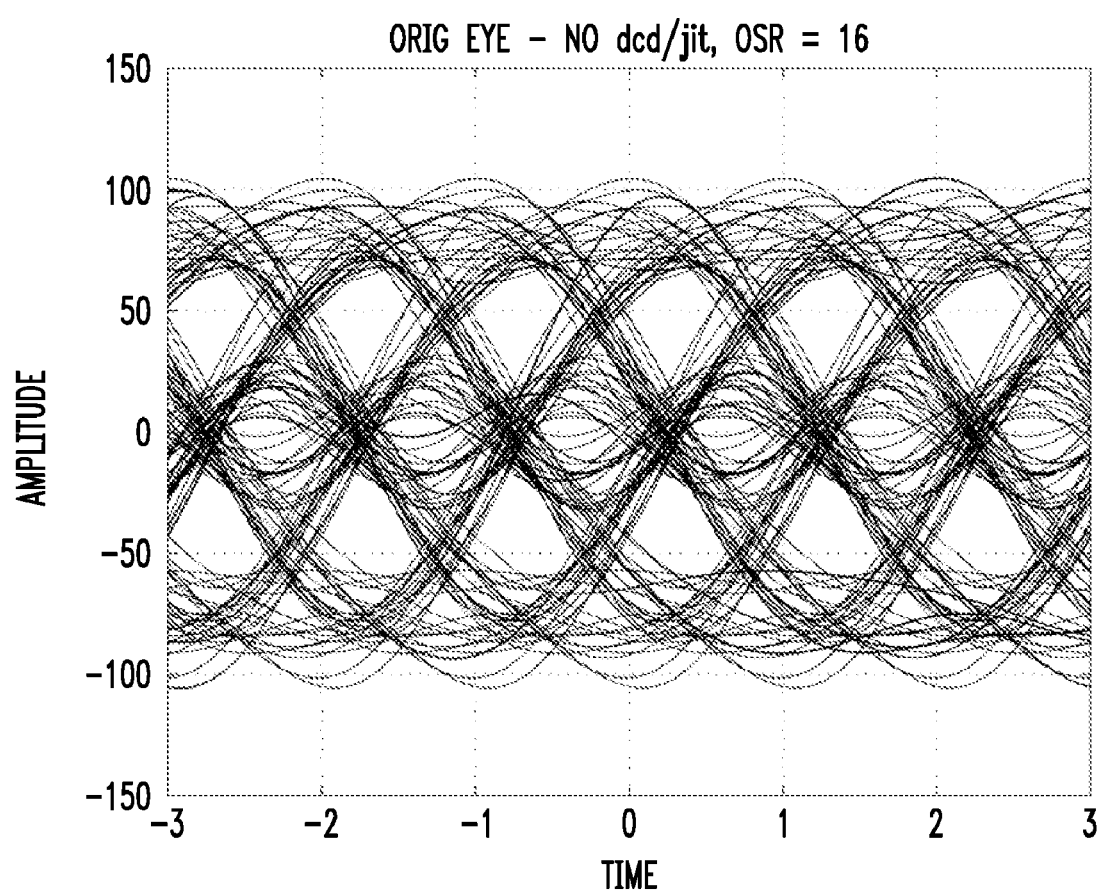

To examine the impact of duty cycle distortion (DCD), where odd/even pulses are transmitted with different widths, the received signal eye diagrams are qualitatively examined without DCD. FIG. 7 illustrates an eye diagram 700 at the output of an RXEQ of an exemplary serializer/deserializer communication channel, where duty cycle distortion is not present. The eye diagram 700 corresponds to a well-known PN7 data pattern. It is noted that all the eyes in the diagram 700 look approximately the same.

Single-Sided DFE Placement Techniques

U.S. patent application Ser. No. 11/540,946, filed Sep. 29, 2006, entitled "Method and Apparatus for Determining Latch Position for Decision-Feedback Equalization Using Single-Sided Eye," incorporated by reference herein, discloses Single-Sided DFE Placement Techniques, incorporated herein by reference. The disclosed Single-Sided DFE Placement Techniques position the vertical slicers using a single sided eye. As used herein, a single-sided eye (also referred to as a DFE eye) contains only transitions from one binary value (i.e., only 1→x or 0→x transitions). The small data eye is the result of the channel distortions that tend to close the data eye. The Single-Sided DFE Placement Techniques recognize that a larger DFE eye can be extracted by constraining the data to only contain signal transitions from, for example, a binary value 1 to a binary value of 0 or 1 (referred to as 1→x), and inhibiting any signal transitions from a binary value of 0.

As discussed further below in conjunction with FIG. 8, when the data is constrained to only have 1→x transitions, a significant amount of distortion that would normally be associated with the 0→x transitions is removed and the resulting upper DFE eye is larger than the small data eye associated with a classical approach. Likewise, when the data is constrained to only have 0→x transitions, a significant amount of distortion that would normally be associated with the 1→x transitions is removed and the resulting lower DFE eye is larger than the small data eye associated with a classical approach. In this manner, by inhibiting one set of binary transitions, the size of the data eye is significantly increased, and the noise margin is improved.

A communication channel typically exhibits a low pass effect on a transmitted signal, causing the opening size of the received data eye to be significantly impaired, with the received data eye often being essentially closed. FIG. 8 illustrates the noise and timing margins for a received signal 800. As shown in FIG. 8, a received signal will typically include transitions 810 from a binary value 1 to a binary value of 0 or 1 (1→x), as well as transitions 820 from a binary value 0 to a binary value of 0 or 1 (0→x).

The Single-Sided DFE Placement Techniques recognize that a larger DFE eye can be extracted by constraining the data to only contain signal transitions from, for example, a binary value 1 to a binary value of 0 or 1 (referred to as 1→x), and inhibiting any signal transitions from a binary value of 0 (or vice versa).

As shown in FIG. 8, when the full set of signal transitions is considered, the size of the classical data eye is approximately associated with the inner circle 870, having an associated timing margin 830 and noise margin 860. The small size of the data eye 870 with the corresponding poor margins 830, 860, makes it very difficult to properly recover the transmitted data. When the data is constrained to only have 1→x transitions, the distortion that would normally be associated with the 0→x transitions is removed and the resulting upper DFE eye, approximately associated with the outer circle 880, is larger than the small data eye 870 associated with a classical approach (and both sets of transitions). The upper DFE eye 880 has an associated timing margin 840 and noise margin 850. Thus, by inhibiting one set of binary transitions 810, 820, the size of the data eye 880 is significantly increased, and the timing and noise margins 840, 850 are improved relative to the corresponding non-DFE margins.

Likewise, when the data is constrained to only have 0→x transitions, a significant amount of distortion that would normally be associated with the 1→x transitions is removed and the resulting lower DFE eye is larger than the small data eye associated with a classical approach In this manner, by inhibiting one set of binary transitions, the size of the data eye is significantly increased, and the noise and timing margins are improved Two DFE data latches and two DFE transition latches can be used to sample the data eye A first DFE data latch is positioned in the vertical center of the outer circle 880 of the upper Single-Sided Eye (1→x) and a second DFE data latch is positioned in the vertical center of the lower Single-Sided Eye (0→x). For a more detailed discussion of DFE data latch positioning techniques, see, U.S. patent application Ser. No. 11/540,946, filed Sep. 29, 2006, entitled "Method and Apparatus for Determining Latch Position for Decision-Feedback Equalization Using Single-Sided Eye," and U.S. patent application Ser. No. 11/686,148, filed Mar. 14, 2007, entitled "Method and Apparatus for Decision-Feedback Equalization Using Single-Sided Eye with Global Minimum Convergence." The threshold of the DFE data latches are denoted herein as c.

Eye Monitoring Based Quality Metrics

FIG. 9 illustrates a single-sided data eye 900 and a number of measured data eye metrics in accordance with an embodiment of the present invention. The single-sided data eye 900 can be considered a cutout of one of the eyes from the eye diagram 700 of FIG. 7 A non-DFE equalized eye 910 is also shown in FIG. 9 as a black oval, which is a subset of the single sided DFE eye 900 If there where no DFE operation to improve system performance, the receiver would sample the raw non-DFE eye 910 at its center and slice it to perform data detection. The sampling at the center of the non-DFE eye 910 can be achieved using a non-DFE CDR, in a similar manner to FIG. 1. Since the height of the non-DFE eye 910 is so small, the performance would be prone to bit errors.

In the case of an exemplary one tap DFE, the bit error performance is related to the height, $\chi$, of the single sided DFE eye 900, as indicated in FIG. 9 The optimum sample point is found by the DFE phase detector-based CDR described above in conjunction with FIG. 5. The single sided DFE eye quality metric can be measured using an eye monitoring operation. It can also be shown that the optimal DFE threshold c is obtained from $\chi$ as follows:

$$c = \lambda + \frac{\chi}{2} \quad (5)$$

where $\chi$ is the minimum amplitude value measured at the bottom 920 of the single sided DFE eye 900.

FIG. 10 is a block diagram of a serializer/deserializer communication channel 1000 that measures the data eye metrics shown in FIG. 9 in accordance with the present invention. The channel 1000 of FIG. 10 comprises a transmit FIR filter (TXFIR) 1010, backplane channel 1020, RXEQ 1030, switch 1040, CDR circuit 1050 (comprised of CDR 1052 and BBPD 1054), exemplary latches 1060-1 and 1060-2, DFE logic 1070, switch 1042, latches 1080-1 and 1080-2, and DFE logic 1090, for the creation of the DFE transition data, in a similar manner to FIG. 5.

In addition, the channel 1000 includes a latch 1092 that samples the incoming sample based on a programmable roaming latch threshold, and a data eye monitor 1094. The data eye monitor 1094 may be implemented using the teachings of U.S. patent application Ser. No. 11/095,178, filed Mar. 31, 2005, entitled "Method and Apparatus for Monitoring a Data Eye in a Clock and Data Recovery System," incorporated by reference herein The data eye monitor 1094 can measure the quality of a DFE eye (e g, a measure of the vertical height of the data eye opening 900). The data eye monitor 1094 combines information from the DFE detected data $\hat{y}_d(n)$ along with data sliced by the latch 1092 at a different programmable roaming latch threshold, ρ (but clocked with the data sampling clock), referred to as $\hat{y}_p(n)$, as shown in FIG. 10.

The technique collects statistics of $(\hat{y}_d(n), \hat{y}_p(n))$ across a multitude of ρ values and over a large number of clock cycles to obtain the DFE eye opening metric, denoted as $\chi$, and the minimum amplitude value, $\chi$. The DFE eye quality metrics can now be used in equation (5) to adapt the DFE coefficients. These quality metrics are valid at the current DFE CDR data sampling clock phase.

Eye Diagrams and Performance in Presence of DCD

Now, consider the impact of duty cycle distortion. FIG. 11 illustrates an eye diagram 1100 at the output of the RXEQ of an exemplary serializer/deserializer communication channel in the presence of duty cycle distortion. The eye diagram 1100 corresponds to a well-known PN7 data pattern As shown in FIG. 11, the even/odd eyes look different and the impact on the non-DFE eye is apparent Without loss of generality, in which eye is called even or odd, it can be seen that even non-DFE eye heights are shrunk while odd non-DFE eye heights are increased. Moreover, it should be apparent that the single sided DFE height will also now be even/odd phase dependent.

Eye Monitoring Based DCD Detection and Correction

To account for DCD, the eye monitoring is performed specific to even/odd phases. Thereafter, threshold positions for one or more of the latches can be determined based on the eye opening metrics for each of the odd and even phases. Consequently, the measurements result in the following quantitites: $\chi_o$ (odd), $\chi_e$ (even), $\chi_o$, $\chi_e$. From this, the optimal DFE coefficients or thresholds are calculate as follows:

$$c_o = \lambda_o + \frac{\chi_o}{2} \quad (6)$$

$$c_e = \lambda_e + \frac{\chi_e}{2} \quad (7)$$

These calculations and the application of even/odd DFE threshold for the one tap DFE case ate shown in FIG. 12 FIG. 12 is a block diagram of a serializer/deseiializer communication channel 1200 that determines one or more filter coefficients based on the measured data eye metrics of FIG. 9 in accordance with the present invention. The channel 1200 of FIG. 12 comprises a transmit FIR filter (TXFIR) 1210, backplane channel 1220, RXEQ 1230, switch 1240, CDR circuit 1250 (comprised of CDR 1252 and BBPD 1254), exemplary latches 1260-1 and 1260-2, DFE logic 1270, switch 1242, latches 1280-1 and 1280-2, and DFE logic 1290, for the creation of the DFE transition data, in a similar manner to FIGS 5 and 10. In addition, the channel 1200 includes a data eye monitor 1294 for computing the eye opening statistics, in a similar manner to FIG. 10

Multiple Latch Sampling

In addition, in order to achieve odd/even specific thresholds or coefficients in accordance with the present invention, the serializer/deserializer communication channel 1200 incorporates a number of multiplexers 1291, 1293 and 1298. As shown in FIG. 12, even/odd coefficients DFE thresholds are muxed by a multiplexer 1298 to the DFE data latches 1260 in accordance with even/odd clock cycle phases. Likewise, when computing the eye opening metrics, the channel 1200 includes a pair of latches 1292-e and 1292-o that sample the incoming sample based on a programmable roaming latch threshold in accordance with even/odd clock cycle phases. The DFE detected data, $\hat{y}_d(n)$ is also applied to the eye monitor 1294 in accordance with even/odd clock cycle phases.

As previously indicated, the eye monitor 1294 computes the height, $\chi$, of the single sided DFE eye and the minimum amplitude value, λ, as discussed above in conjunction with FIG. 3, for both even and odd phases.

In some implementations, sampling of the data occurs in parallel such that parallel samples are clocked with clocks spaced apart by integer multiples of the baud period. For example, in a 4T parallel data sampling scheme, four data latches would be required to clock four samples y(n),y(n→T), y(n→2T),y(n→3T). In the case of DFE, this translates to eight latches. Let the latch sets for each of the four sampling clocks be labeled as latch sets 0, 1, 2, 3. Without loss of generality, latch sets 0, 2 can assigned to be even phases and latches 1, 3 to be odd phases. In this fashion, the even/odd eye monitoring can be directly tied to the physical latch placement rather than any even/odd clock phasing. For example, data related to latch sets 0, 2 can be processed as even samples and data related to latches 1, 2 can be processed as odd samples. In this case, since latch sets 0 and 2 are likely to have similar DCD impairments, data from either set could be used to perform the even sample calculations resulting in $c_e$ and similarly data from either sets 1 or 3 could be used to produce $c_o$. Once $c_e$ and $c_e$ are computed, they are applied during actual data detection phase to latches 0, 1, 2, 3 based on their even/odd designation.

Complementary Single Sided Eye

The previous examples have assumed the use of a single sided DFE eye which in FIG. 9 is the upper single sided DFE eye. As is apparent from the eye diagrams of FIG. 8, there is a complementary single sided DFE eye which is the lower DFE and corresponds to mostly negative amplitude values. In practice, one may or may not consider both upper or negative eyes depending on how asymmetric the signal could be and/or increase in measurement time or implementation complexity. However, if one considered both single sided eyes, the invention details remain fundamentally unaltered as the results from the upper and lower eyes can be averaged after appropriately taking into account the sign of the lower sided eye with respect to the upper sided eye, as would be apparent to a person of ordinary skill in the art.

Non Eye Monitoring Based DFE Coefficient Calculation

The DCD measurement process and resulting application have been illustrated in the context of a DFE equalized signal through the example of a one tap DFE implemented using pipelined logic such that the one tap DFE coefficient is equivalent to a latch threshold c. The optimum DFE coefficient was calculated based on eye monitoring quality metrics such as λ and χ. However, the optimum DFE coefficient/threshold could also be calculated, for example, based on an least mean squared (LMS) adaptation and settling of the coefficient/threshold making use of $y_d(n-1)$ and (its delayed versions for multi-tap DFE) and possibly other signals, such as the sign of an error signal, ê(n) which could be generated through the use of additional latches. The kth DFE tap coefficient could be adapted using the following algorithm:

$$c_k(n)=c_k(n-1)+\mu\hat{e}(n)\hat{y}_d(n-k) \quad (8)$$

where μ is an adaptation gain factor, $\hat{y}_d(n)$ can take values of 1 or −1 and ê(n) could take on binary values of 1 and −1 (or say 1,0,−1 at the expense of more implementation complexity).

In such a case, the LMS adaptation of the DFE coefficients could be conditioned on odd/even clock phase to account for the DCD The resulting DFE coefficients corresponding to odd/even phases would be applied appropriately during the data/detection phase to the odd/even data.

In further variations, the invention can be employed with alternative DFE phase detectors. In addition, while the invention has been described in conjunction with a one tap DFE implementation, the invention can be extended with more complexity to additional DFE taps. The logic equations to generate $\hat{y}_{dt}(n)$, $\hat{y}_d(n)$, (or additional signals if considering a PD with more levels) will change accordingly. Likewise, the DFE logic examples shown for the one tap DFE including logic to generate DFE transition, early, and late data for the DFE phase detectors assume an equivalent positive DFE coefficient, i.e., b(1)=c where c>0. As would be apparent to one familial with the art, the corresponding logic is easily derived for c<0.

Digital Logic Considerations

A plurality of identical die are typically formed in a repeated pattern on a surface of the wafer. Each die includes a device described herein, and may include other structures or circuits. The individual die are cut or diced from the wafer, then packaged as an integrated circuit. One skilled in the art would know how to dice wafers and package die to produce integrated circuits Integrated circuits so manufactured are considered part of this invention.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

It is to be understood that the embodiments and variations shown and described herein are merely illustrative of the principles of this invention and that various modifications may be implemented by those skilled in the art without departing from the scope and spirit of the invention.

We claim:

1. A method for determining one or more coefficients for a receiver filter, comprising: determining a first coefficient for a first phase of a data eye; and determining a second coefficient for a second phase of said data eye, wherein said first and second phases have a spacing that is substantially equal to an integer multiple of a unit interval, wherein said receiver filter is a decision-feedback equalizer, wherein each of said determining steps further comprise the steps of obtaining first and second eye opening metrics from a data eye monitor corresponding to each of said respective first phase and said second phase; and determining said respective first and second coefficients based on said corresponding first and second eye opening metrics and wherein said first and second eye opening metrics are based on statistics of DFE detected data and samples obtained using at least one roaming latch.

2. The method of claim 1, wherein each of said determining steps further comprise the step of performing an LMS adaptation of decision-feedback equalization coefficients.

3. A method for determining a threshold position of one or more latches employed by a decision-feedback equalizer, comprising: obtaining a plurality of samples of a data eye using a data eye monitor; obtaining a first eye opening metric from said data eye monitor corresponding to a first phase and a second eye opening metric from said data eye monitor corresponding to a second phase, wherein said first and second phases have a spacing that is substantially equal to an integer multiple of a unit interval; determining a first threshold position associated with said first phase for said one or more latches based on said first eye opening metric; and determining a second threshold position associated with said second phase for said one or more latches based on said second eye opening metric, wherein said first and second eye opening metrics are based on statistics of DFE detected data and samples obtained using at least one roaming latch.

4. The method of claim 3, wherein said first and second eye opening metrics measure a degree of opening of a data eye.

5. The method of claim 3, wherein said at least one roaming latch samples said single-sided data eye for a plurality of voltage settings.

6. The method of claim 3, wherein said data eye is a single-sided6 data eye.

7. The method of claim 6, wherein said single-sided data eye only contains transitions from a first binary value to a binary value of 0 or 1.

8. The method of claim 3, wherein said eye opening metric is obtained for a plurality of latch settings and wherein said steps of determining said first and second threshold positions selects said latch setting that approximately maximizes said eye opening metric.

9. The method of claim 3, further comprising the step of obtaining a first amplitude value associated with said first eye opening metric corresponding to said first phase and a second amplitude value associated with said second eye opening metric corresponding to said second phase.

10. The method of claim 9, wherein said steps of determining said first and second threshold positions are further based on said corresponding first and second amplitude values.

11. The method of claim 3, wherein said first and second phases correspond to odd and even phases.

12. The method of claim 3, further comprising the step of multiplexing between said first and second thresholds for at least one latch.

13. The method of claim 3, wherein said first and second threshold positions are used for upper and lower data eyes.

14. A decision-feedback equalizer, comprising: a plurality of latches for obtaining a plurality of data samples; a data eye monitor for obtaining a first eye opening metric corresponding to a first phase and a second eye opening metric corresponding to a second phase, wherein said first and second phases have a spacing that is substantially equal to an integer multiple of a unit interval; a coefficient computation block for determining a first threshold position associated with said first phase for said one or more latches based on said first eye opening metric; and a coefficient computation block for determining a second threshold position associated with said second phase for said one or more latches based on said second eye opening metric, wherein said first and second eye opening metrics are based on statistics of DFE detected data and samples obtained using at least one roaming latch.

15. The decision-feedback equalizer of claim 14, wherein said first and second eye opening metrics measure a degree of opening of a data eye.

16. The decision-feedback equalizer of claim 14, wherein said data eye is a single-sided data eye.

17. The decision-feedback equalizer of claim 14, wherein said eye opening metric is obtained for a plurality of latch settings and wherein said steps of determining said first and second threshold positions selects said latch setting that approximately maximizes said eye opening metric.

18. The decision-feedback equalizer of claim 14, wherein said data eye monitor is further configured to obtain a first amplitude value associated with said first eye opening metric corresponding to said first phase and a second amplitude value associated with said second eye opening metric corresponding to said second phase.

19. The decision-feedback equalizer of claim 18, wherein said first and second threshold positions are further based on said corresponding first and second amplitude values.

20. The decision-feedback equalizer of claim 14, wherein said first and second phases correspond to odd and even phases.

21. The decision-feedback equalizer of claim 14, further comprising one or more multiplexers to switch between said first and second thresholds for at least one latch.

* * * * *

UNITED STATES PATENT AND TRADEMARK OFFICE
CERTIFICATE OF CORRECTION

PATENT NO. : 8,107,522 B2
APPLICATION NO. : 11/870908
DATED : January 31, 2012
INVENTOR(S) : Pervez M. Aziz, Mohammad S. Mobin and Lane A. Smith It is certified that error appears in the above-identified patent and that said Letters Patent is hereby corrected as shown below:

In the Claims

Column 13, claim 6, line 22, which reads: "single-sided6 data" should read --single-sided data--.

Signed and Sealed this
Fifteenth Day of October, 2013

Teresa Stanek Rea
*Deputy Director of the United States Patent and Trademark Office*